(No Model.)
A. KERRY.
RUNNING GEAR.
No. 531,950. Patented Jan. 1, 1895.
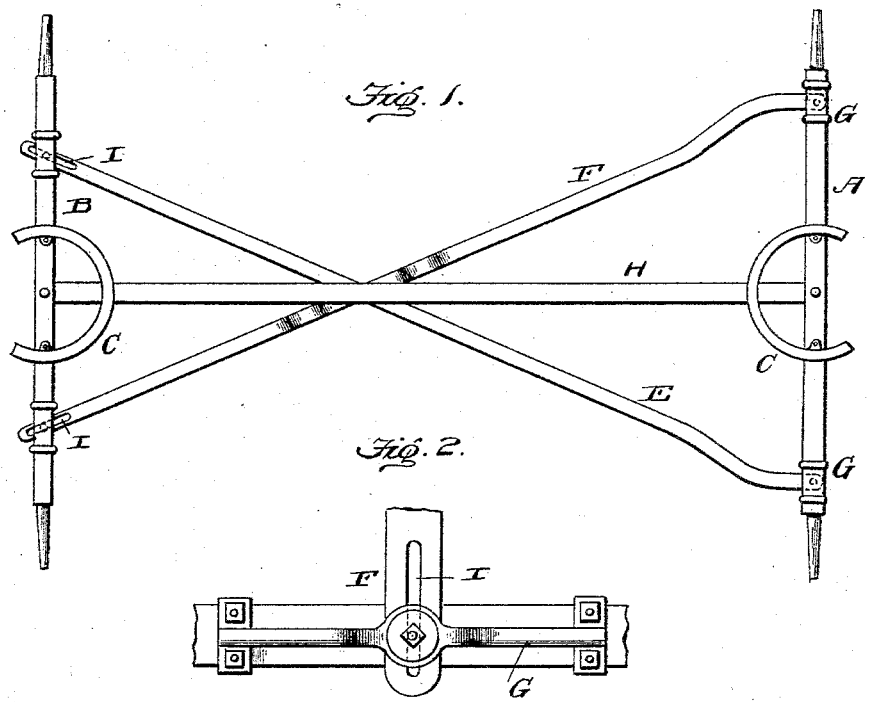
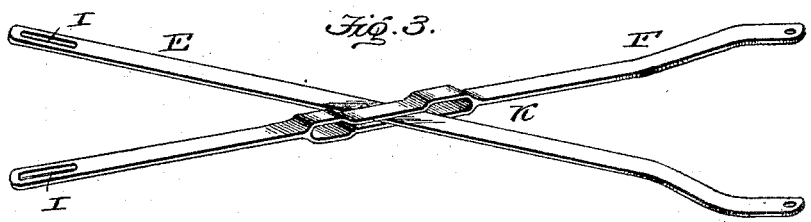
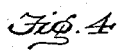
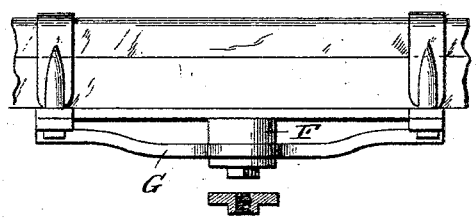
Witnesses:
Aaron Kerry,
Inventor:

UNITED STATES PATENT OFFICE.

AARON KERRY, OF PORT HURON, MICHIGAN, ASSIGNOR OF ONE-HALF TO GEORGE H. TREADGOLD, OF SAME PLACE.

RUNNING-GEAR.

SPECIFICATION forming part of Letters Patent No. 531,950, dated January 1, 1895.

Application filed June 4, 1894. Serial No. 513,451. (No model.)

*To all whom it may concern:*

Be it known that I, AARON KERRY, a citizen of the United States, residing at Port Huron, in the county of St. Clair and State of Michigan, have invented certain new and useful Improvements in Running-Gears; and I do hereby declare the following to be a full, clear, and exact description of the invention, such as will enable others skilled in the art to which it appertains to make and use the same.

The object of this invention is to form wagons and four wheeled vehicles so as to turn almost as freely as those of two wheels, in a practical and desirable manner; and to do this, and to avoid practical disadvantages therein, the invention consists in forming the running gears or wheel frame consisting of the axles and their fifth wheels and connecting parts substantially as set forth hereinafter, and as shown in the drawings, in which—

Figure 1, is a plan view of the running gears or axles and connections of a four wheel vehicle. Fig. 2, is a detail view of the front cross reach attachment from below. Fig. 3, shows the two cross reaches in detail in perspective. Fig. 4, is a detail view of the back cross reach connection from the rear.

The vehicle is made with four wheels and two axles A. B. of the ordinary or any suitable construction. The axles are provided with fifth wheels, C. C. on each, which may be either full circles or half circles as may be prepared and suited to the use. The axles are connected by two diagonal reaches E. F. forming a cross as illustrated, and by a central straight reach K. The reaches E. F. are pivoted on the under side of the hind axles by means of connections G. at the sides near the wheels, each of which is formed of two portions clamped to the axle on each side, and bent apart so as to receive the end of the reach between, and having a vertical pivot pin to hold the end of the reach.

The reaches E. F. connect with the fore axle, on the opposite sides, by means of similar connections. The front ends of these reaches are slotted, at I, so each may slide a little therein to avoid cramping, and give some elasticity, while the reaches serve to hold the two axles and wheels with some, but avoiding too much flexibility, as needed for use. This is also provided for by providing a slot H. in the middle of one reach through which the other passes. This slot is of some length so as to allow the reaches to slide by means of slot I, but the two side parts are bent together so as to bind by a spring action on the reach within the slot to hold it secure and avoid rattling while permitting it to slide for turning. The reaches E, F. are bent near their rear ends, as shown, to allow the front wheel to turn far back without cramping, while securing wider points of attachment with the rear than with the front axle; as provided for by the slots I. The reaches E. F. connect the bottoms, of the axles while the central reach connects the top. The central reach K. is provided with suitable bearings to support the fifth wheels C. D. while allowing them free motion thereon for turning.

What I claim is—

1. In a vehicle two stiff cross reaches E. F. connecting the front and rear axles and provided with a slot in one through which the other passes such slot having length to allow them to turn and slide freely, while its sides are bent together to bind spring-like on the inclosed reach.

2. In a vehicle two stiff cross reaches E. F. connecting the rear and front axles, set wider apart on the rear than on the front axles, and bent near their rear ends to avoid contact with the front wheels, and provided with slots in their front ends to permit adjustability in turning without too much flexibility, and provided with a slot in one through which the other passes, and by which it is held by a spring action while free to move and slide therein, in combination with a central reach without slot connecting the axles at different level, and provided with bearings to support a fifth wheel on each axle, substantially as and for the purpose set forth.

In testimony whereof I affix my signature in presence of two witnesses.

AARON KERRY.

Witnesses:
JNO. M. GLEASON,
WM. STEPHENSON.